US009742169B1

(12) United States Patent
Matsumura

(10) Patent No.: US 9,742,169 B1
(45) Date of Patent: Aug. 22, 2017

(54) JUNCTION BOX ASSEMBLIES WITH SEQUENTIALLY ELEVATED OPENINGS

(71) Applicant: Sumitomo Wiring Systems, Ltd., Yokkaichi, Mie (JP)

(72) Inventor: Akihiro Maximilian Matsumura, Farmington Hills, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/194,692

(22) Filed: Jun. 28, 2016

(51) Int. Cl.
H02G 3/08 (2006.01)
H02G 3/04 (2006.01)

(52) U.S. Cl.
CPC .......... *H02G 3/081* (2013.01); *H02G 3/0481* (2013.01); *H02G 3/083* (2013.01)

(58) Field of Classification Search
CPC ...... H02G 3/081; H02G 3/0481; H02G 3/083; H02G 3/08; H02G 3/00; H02G 3/04; H02G 3/0462; H02G 3/22; H02G 3/088; H05K 5/00; H05K 5/02; H01H 9/02; B60R 16/02; B60R 16/0207; B60R 16/0215; B60R 16/0238
USPC .......... 174/50, 53, 57, 58, 559, 520, 59, 60, 174/68.1, 68.3, 72 A; 248/68.1, 49; 220/3.2, 3.3, 4.02; 439/76.1, 76.2
See application file for complete search history.

(56) References Cited

U.S. PATENT DOCUMENTS

| 5,959,250 A * | 9/1999 | Daoud ................... H02G 3/088 248/56 |
| 6,515,226 B2 * | 2/2003 | Chiriku ............... B60R 16/0238 174/50 |
| 6,911,600 B2 * | 6/2005 | Kiyota ................... H02G 3/088 248/56 |
| 8,907,215 B2 * | 12/2014 | Sakai ................... H02G 3/0691 439/76.2 |
| 9,214,792 B2 * | 12/2015 | Kakimi ................. H02G 3/088 |
| 2014/0338949 A1 | 11/2014 | Kakimi et al. |

FOREIGN PATENT DOCUMENTS

| JP | 2016019406 A | 2/2016 |
| WO | 2015029816 A1 | 3/2015 |

* cited by examiner

*Primary Examiner* — Angel R Estrada
(74) *Attorney, Agent, or Firm* — Dinsmore & Shohl LLP

(57) ABSTRACT

An electric junction box assembly configured to help preserve the structural integrity of a bend in a tube is provided. The electric junction box assembly includes a junction box having at least one tube opening. The tube opening extends from an outer surface of the junction box into the inner space of the junction box. The tube opening is configured to hold the bend of the tube. The tube opening includes an outer opening and at least one inner opening. The outer opening is formed on an outer wall of the junction box and the inner opening is formed on an inner wall of the junction box. The inner opening is elevated with respect to the outer opening. Accordingly, the electric junction box assembly distributes the load of the weight of a tube and wire assembly so as to preserve the integrity of the tube and wire assembly.

18 Claims, 4 Drawing Sheets

JUNCTION BOX ASSEMBLIES WITH SEQUENTIALLY ELEVATED OPENINGS

TECHNICAL FIELD

The present specification generally relates to electric junction box assemblies and, more particularly electric junction box assemblies configured to accommodate a tube with a bend.

BACKGROUND

In general, electric junction box assemblies include a junction box for storing electric components. The electric components are configured to power and control electronic devices. The electric components illustratively include a bus bar, relays, switches and a controller for controlling electric devices. For instance, the electric junction box assemblies may be used in an automotive vehicle to control the actuation of windshield wipers, fans for the HVAC system, mirrors or the like.

The electric junction box assembly may be housed under the hood of the automotive vehicle. In such instances, the electric junction box assembly competes for packaging space with various automotive components. Accordingly, it is often desirable to reduce the packaging size of the junction box assembly by having a tube for supplying electric power. Wire (not shown) is disposed within the tube and the tube may be bent about a side wall of the junction box assembly such that an elongated portion of the tube is disposed along the side wall of the junction box assembly. An illustration showing the bent tube is provided in FIG. 1.

However, having the tube bent may cause wear on the wire and the tube by the weight of the tube and wire pulling down on itself. In some instances, the weight of the tube and wire generates as a cantilevered force, indicated by the arrow shown in FIG. 1, applied onto the bent portion of the tube. Such a constant load may cause eventual wear and tear of the tube, exposing the wire. Accordingly, it remains desirable to have an electronic junction box assembly configured to distribute the load of the tube and the wire so as to help preserve the structural integrity of the tube and wire assembly.

SUMMARY

In one embodiment, an electric junction box assembly configured to distribute the load of the weight of a tube and wire assembly so as to preserve the integrity of the tube and wire assembly is provided. The electric junction box assembly includes a junction box. The junction box may include a top cover, a central housing and a bottom cover. The junction box further includes at least one tube opening. The tube opening extends from an outer surface of the junction box into the inner space of the junction box.

The tube opening includes an outer opening and at least one inner opening. The outer opening is formed on an outer wall of the junction box and the inner opening is formed on an inner wall of the junction box. The inner opening is elevated with respect to the outer opening. In embodiments where the junction box includes a plurality of inner openings, the tube openings are sequentially elevated with each other, wherein the outer opening disposed on the outer wall of the junction box is the lowest, and the inner opening disposed furthest from the outer wall of the junction box is the highest.

In one embodiment, the tube openings are formed in halves, wherein a top half of the tube opening is formed on a top half of an inner wall of the central housing and a bottom half is formed on a bottom half of an inner wall of the bottom cover.

In another embodiment, the central housing includes a plurality of first inner walls, each of the plurality of first inner walls is spaced apart from each other. Likewise, the bottom cover includes a plurality second inner walls, each of the plurality of second inner walls is spaced apart from each other. Each of the first inner walls includes a first circumferential edge forming a top half of an opening. Each of the second inner walls include a second circumferential edge forming a bottom half of an opening. In such an embodiment, the tube opening is completed by mating the bottom cover to the central housing.

In another embodiment, each of the first and second circumferential edges are beveled. In particular, the circumferential edges are beveled so as to formed a support surface angled to be commensurate with the bend of the tube. In yet another embodiment, the openings are smaller in diameter as the openings progress from the outer surface of the junction box to the inner space of the junction box.

Accordingly, a junction box assembly is provided that is configured with a tube opening having a plurality of openings formed on the outer surface of a wall of the junction box and inner walls of the junction box which are sequentially elevated so as to conform to a bend in the tube. As such, the junction box assembly distributes the weight of the tube along the bend so as to help preserve the structural integrity of the tube.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of electric junction box assemblies configured to help preserve the structural integrity of a bend in a tube. The electric junction box assembly includes a junction box. The junction box may include a top cover, a central housing and a bottom cover. The junction box further includes at least one tube opening. The tube opening extends from an outer surface of the junction box into the inner space of the junction box.

The tube opening is configured to hold a bend in the tube. The tube opening includes an outer opening and at least one inner opening. The outer opening is formed on an outer wall of the junction box and the inner opening is formed on an inner wall of the junction box. The inner opening is elevated with respect to the outer opening. In embodiments where the junction box includes a plurality of inner openings, the tube openings are sequentially elevated with each other, wherein the outer opening disposed on the outer wall of the junction box is the lowest, and the inner opening disposed furthest from the outer wall of the junction box is the highest.

A distal end of the tube is mounted within the inner most inner opening. The bend is housed within the junction box, wherein the inner openings are positioned so as to support the tube along its bend. Accordingly, the electric junction box assembly distributes the load of the weight of a tube and wire assembly so as to preserve the integrity of the tube and wire assembly.

Directional terms as used herein—for example "up", "down", "right", "left", "front", "back", "top", "bottom"— are made only with reference to the figures as drawn and are not intended to imply absolute orientation.

Figure 2:
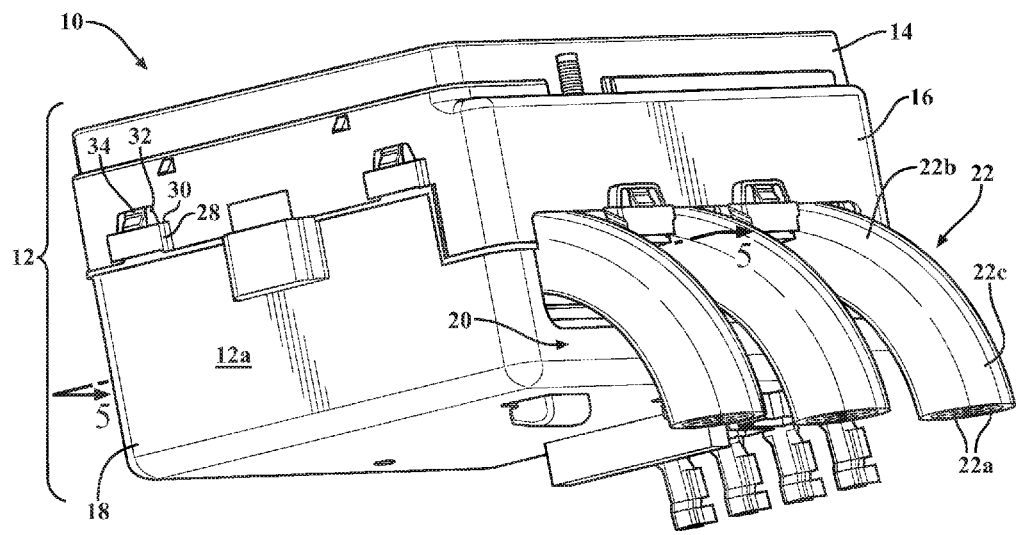
FIG. 2 is a perspective view of an electric junction box assembly according to one or more embodiments described herein.

With reference now to FIG. 2 an electric junction box assembly 10 in accordance to one or more embodiments described herein is provided. The electric junction box assembly 10 includes a junction box 12. The junction box 12 is configured to store electric components (not shown). The junction box 12 may include a top cover 14, a central housing 16 and a bottom cover 18. However, it should be appreciated that the junction box may be formed in a single piece. The junction box further includes at least one tube opening 20. A tube 22 is mounted in the tube opening 20. The tube 22 includes a distal end portion 22a, a bend 22b (shown in FIG. 5) and a proximal end portion 22c. The tube 22 includes a bore 22a configured to house a wire 22a for providing an electric connection to the electric components. For illustrative purposes, the electric junction box is shown and described herein as having three tube openings 20, however, it should be appreciated that the number of tube openings 20 is provided for illustrative purposes only and is not limiting to the scope of the appended claims. Further, the description herein is made to a single tube opening 20, but it should be appreciated that the description of a single tube opening 20 is sufficient to describe the other tube openings without deviating from the scope of the appended claims.

Figure 3:
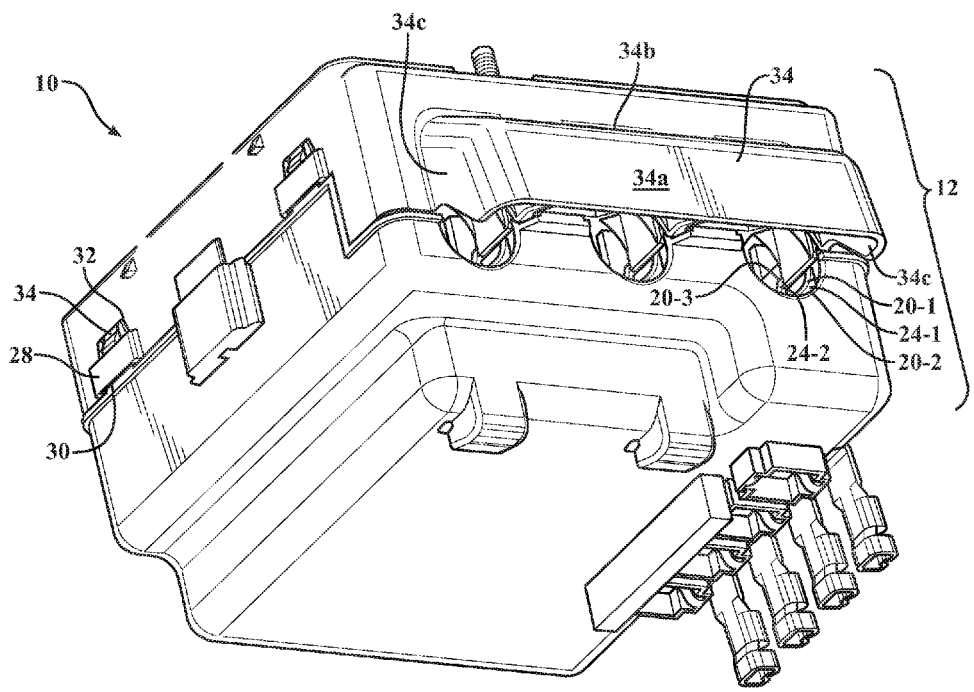
FIG. 3 is a perspective view of the electric junction box assembly shown in FIG. 2 taken from the underside with the tube and top cover removed.

With reference again to FIG. 2 and now to FIG. 3, an illustration of the electric junction box assembly 10 is provided with the top cover 14 and the tube 22 removed so as to provide a clearer illustration of the tube opening 20. The tube opening 20 extends from an outer wall 12a of the junction box into the inner space 12b (shown in FIG. 5) of the junction box 12. The tube opening 20 includes a plurality of openings. One of the tube openings 20 is an outer opening 20-1 formed on the outer wall 12a of the junction box 12. The other of the tube openings 20 are inner openings 20-2, 20-3. The inner openings 20-2, 20-3 are formed on respective inner walls 24 of the junction box 12. For illustrative purposes, the junction box 12 is shown having a pair of inner walls. Each of the inner openings 20-2, 20-3 are formed on a respective inner wall 24-1, 24-2. However, it should be appreciated that the number of inner walls 24 and inner openings 22 are provided for illustrative purposes and are not limiting to the scope of the appended claims.

Figure 4:
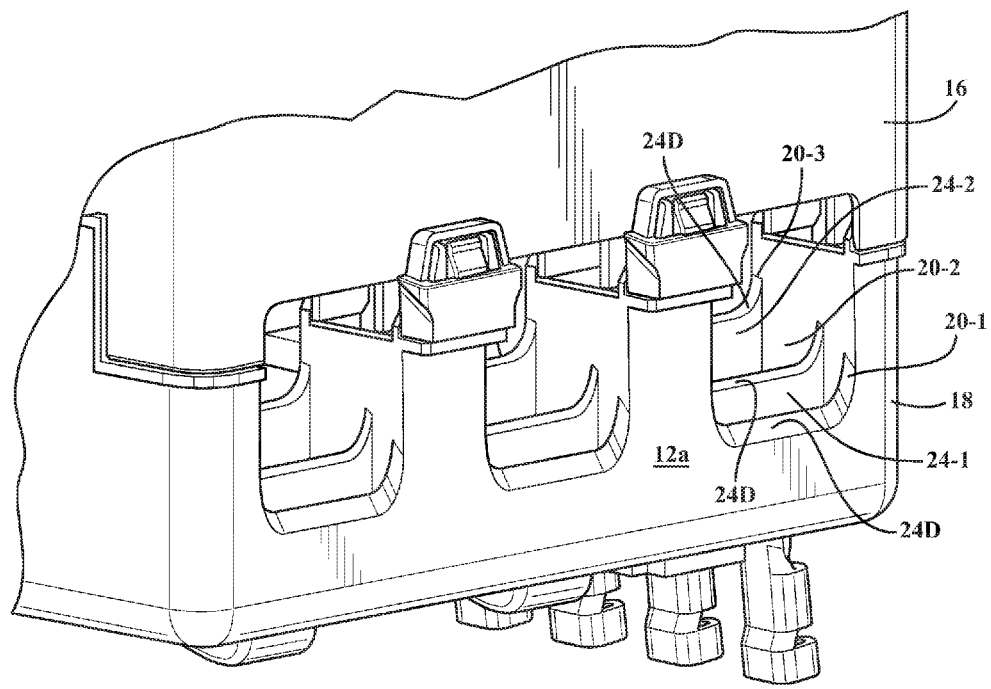
FIG. 4 is a perspective view taken from the front of the electric junction box assembly shown in FIG. 3.

With reference again to FIGS. 2 and 3 and now to FIG. 4, an illustration of the orientation of the tube opening 20 is discussed. In general, the tube opening 20 is configured to accommodate the bend 22b of the tube 22. In particular, the tube opening 20 is sequentially elevated, wherein the outer opening 20-1 disposed on the outer wall 12a of the junction box is the lowest, and the inner opening 20-3 disposed furthest from the outer wall 12a of the junction box is the highest.

Figure 1:
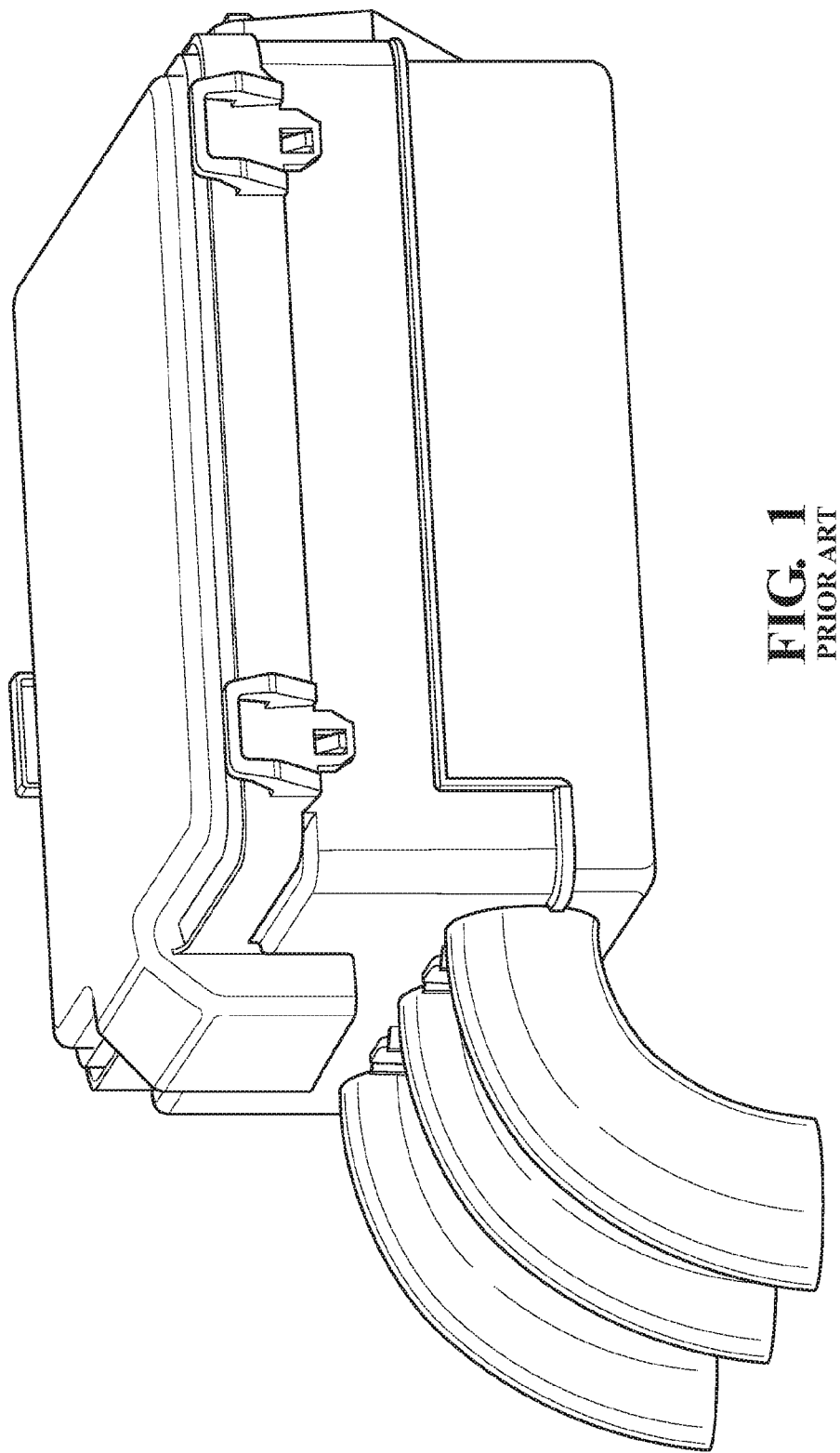
FIG. 1. is a perspective view of an electric box assembly in accordance to a prior art construction.
Figure 5:
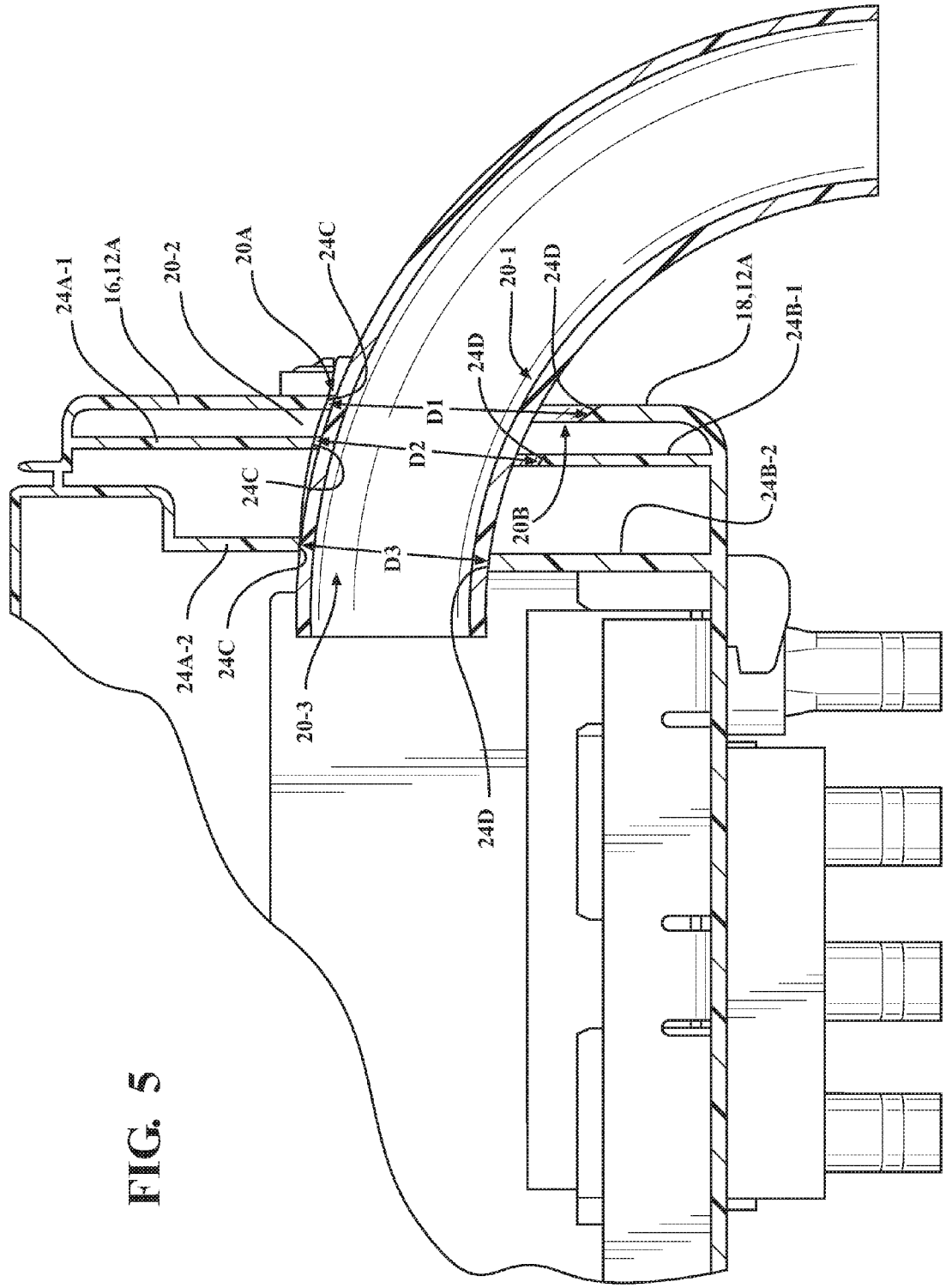
FIG. 5 is a cross-sectional view of the electric junction box assembly shown in FIG. 2 taken along lines 5-5.

With reference now to FIG. 5 a cross-sectional view of the junction box assembly 10 shown in FIG. 1 taken along lines 5-5 is provided. FIG. 5 illustrates one embodiment of the junction box 12 wherein the tube opening 20 is formed in halves. A top half 20A of the tube openings 20-2, 20-3 are formed on the top half 24A of the inner wall disposed on the central housing 16 and a bottom half 20B of the tube opening 20 is formed on a bottom half 24B of the inner wall disposed on the bottom cover 18. A top half 20A of the outer tube opening 20-1 is formed in part by the outer surface 12A of the central housing 16 and the outer surface 12a of the bottom cover 18.

For illustrative purposes, the junction box assembly 10 is shown having two inner walls 24-1, 24-2. However, it should be appreciated that the junction box assembly 10 may include only one inner wall 24 or more than two inner walls 24, and the number of inner walls 24-$n$ (wherein "n" equals the number of inner walls) the inner wall disposed on, and consequently inner openings 20-$n$ (wherein "n" equals the number of inner openings), is unlimited.

In the embodiment where the tube openings 20 are formed by in halves, the central housing includes a predetermined number of top halves 24A of the inner walls 24, each of the plurality of top halves 24A-n of the inner walls 24 is spaced apart from each other (where "n" is the number of inner walls 24). Likewise, the bottom cover includes a plurality bottom halves 24B-n of inner walls 24, (where "n" is the number of inner walls 24), corresponding to the number of top halves 24A-n of the inner walls 24, each of the plurality of bottom halves 24B-n of the inner walls 24 is spaced apart from each other.

Each of the top halves 24A of the inner walls 24 includes a first circumferential edge 24C forming a top half of an opening 20A-n (where "n" is the number of tube openings 20). Likewise, each of the bottom halves 24B of the inner walls 24 include a second circumferential edge 24D forming a bottom half of an opening. In such an embodiment, the tube opening 20 is completed by mating the bottom cover 18 to the central housing 16.

FIGS. 2 and 3 provide an illustrative example of a mating configuration suitable for use herein. For illustrative purposes, the mating configuration is shown as a snap-fit engagement 26. The central housing 16 includes a bracket 28 having a slit 30 for receiving a prong 32 mounted to the bottom cover 18. The prong 32 is illustratively shown having a ramp shaped body 34 generally centered on the prong 32. The ramp shaped body is configured to engage the slit 30 as shown in FIGS. 2 and 3 so as to form a snap-fit engagement.

FIGS. 3-4 provide another embodiment of the junction box assembly 10 wherein each of the first and second circumferential edges 24C, 24D are beveled. In particular, the circumferential edges 24C, 24D are beveled so as to formed a support surface angled to be commensurate with the bend of the tube 22. The beveled circumferential edges help prevent the occurrence of a sharp edge from cutting the tube 22. In particular, having the circumferential edges 24C, 24D beveled allows the tube 22 to press against the circumferential edge 24D without being pinched by an acute edge. Thus, the bevel edges of circumferential edges 24C, 24D may be beneficial in preserving the integrity of the tube 22. FIGS. 4 and 5. Illustrate how the beveled edges of the circumferential edges 24D are angled differently from each other. In particular, FIG. 5 shows how the circumferential edge 24D of the outer opening 20-1 has a greater angle relative to the circumferential edge 24D of inner opening 20-2. Likewise, the circumferential edge 24D of inner opening 20-2 has a greater angle relative to the circumferential edge 24D of inner opening 20-3. FIGS. 4 and 5 illustrate how the beveled edges of the circumferential edge 24D of the tube opening 20 is dimensioned to comport with the bend 22b of the tube 22 so as to minimize the wear and tear applied to the tube 22 about the bend 22b when a downward load is applied to the tube 22. Such a downward load may occur from the weight of the tube 22 itself or the movement of the junction box assembly 10 when installed in an automotive vehicle (not shown).

FIG. 5 shows yet another embodiment of the junction box assembly wherein the tube opening 20 has a diameter that gets smaller as the tube opening 20 extends from the outer wall 12a to the inner space 12b. FIG. 5 shows the inner openings 20-2, 20-3 are smaller in diameter as the outer opening 20-1. The inner openings may become smaller in diameter as the tube openings 20 progress from the outer wall 12a of the junction box 12 to the inner space 12b of the junction box 12. In particular, the diameter of the outer opening 20-1 is the largest, having a diameter of D1. The outer opening 20-1 is configured such that the circumferential edges 24C, 24D are spaced apart from the tube 22, which allows the tube 22 to move within the confines of the outer opening 20-1 within a predetermined tolerance. It should be appreciated that such a configuration also helps reduce vibration which may be generated between the tube 22 and the outer opening 20-1.

Inner opening 20-2 has a diameter D2 slightly smaller than the diameter D1 of the outer opening 20-1. The dimension of inner opening 20-2 provides less tolerance for tube 22, thus reducing the amount of distance the tube 22 may travel downwardly. Inner opening 20-3 has a diameter D3 configured to fittingly engage the tube 22 so as to help secure the tube 22 in the inner space 12b of the junction box 14.

With reference again to FIG. 3, the junction box assembly 10 may further include a hood 34. The hood may be integrally formed to the central housing 16 and is configured to cover the tube opening 22. The hood includes a top wall 34b angled outwardly from the outer surface 12a of the central housing 16. A front wall 34a extends downwardly from the top wall 34b so as to be disposed generally in front of the tube openings 20. A pair of side walls 34c enclose the sides of the hood 34 so as to protect the bend 22b of a tube 22 mounted within the tube openings 20.

Accordingly, a junction box assembly is configured with a tube opening having a plurality of openings formed on the outer surface of a wall of the junction box and inner walls of the junction box which are sequentially elevated so as to conform to a bend in the tube. As such, the junction box assembly distributes the weight of the tube along the bend so as to help preserve the structural integrity of the tube. Further, in some embodiments, the junction box assembly reduces vibrational noises generated by the tube by having the diameter of the outer opening larger than the diameter of the tube.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. An electric junction box assembly configured to support a tube, the tube configured to provide an electric connection to the junction box assembly, the junction box assembly comprising:
    a junction box having an outer wall and a bottom wall and at least one inner wall defining an inner space of the junction box, each of the at least one inner wall extending upwardly from the bottom wall; and
    a tube opening, the tube opening including an outer opening formed on a portion of the outer wall extending upwardly from the bottom wall so as to be elevated above the bottom wall, and an inner opening formed on a distal end of each of the at least one inner walls, wherein the inner openings are sequentially elevated with respect to the outer opening, wherein the outer opening disposed on the outer wall is the lowest, and the inner opening disposed on the at least one inner wall furthest from the outer wall of the junction box is the highest, wherein the tube opening of the outer wall and at least one inner wall provide support for the tube.

2. The electric junction box assembly as set forth in claim 1, wherein the junction box includes a top cover, a central housing and a bottom cover.

3. The electric junction box assembly as set forth in claim 2, wherein the tube opening is formed by a top half and a bottom half.

4. The electric junction box assembly as set forth in claim 3, wherein the top half of the tube opening is disposed on the central housing and the bottom half of the tube opening is formed disposed on the bottom cover.

5. The electric junction box assembly as set forth in claim 4, wherein the central housing and the bottom cover are configured to engage each other.

6. The electric junction box assembly as set forth in claim 1, the tube opening has a beveled edge.

7. The electric junction box assembly as set forth in claim 6, wherein the beveled edge of the outer opening is angled more than the beveled edge of the inner opening so as to conform to a bend in a tube.

8. The electric junction box assembly as set forth in claim 7, wherein the tube opening has a diameter that gets smaller as the tube opening extends from the outer wall to the inner space.

9. The electric junction box assembly as set forth in claim 1, further including a hood, the hood over the tube opening.

10. An electric junction box assembly, configured to store electric components, the electric junction box comprising:
    a junction box configured to store the electric component, the junction box having an outer wall and a bottom wall and at least one inner wall defining an inner space of the junction box, each of the at least one inner wall extending upwardly from the bottom wall;
    a tube attached to the junction box, the tube having a distal end, a bend and a proximal end, the distal end of the tube disposed within the inner space of the junction box, and a tube opening, the bend of the tube held within the tube opening, the tube opening including an outer opening formed on a portion of the outer wall extending upwardly from the bottom wall so as to be elevated above the bottom wall, and an inner opening formed on a distal end of each of the inner walls, wherein the inner openings are sequentially elevated with respect to the outer opening, wherein the outer opening disposed on the outer wall is the lowest, and the inner opening disposed on the at least one inner wall furthest from the outer wall of the junction box is the highest, wherein the tube opening of the outer wall and at least one inner wall provide support for the tube.

11. The electric junction box assembly as set forth in claim 10, wherein the junction box includes a top cover, a central housing and a bottom cover.

12. The electric junction box assembly as set forth in claim 11, wherein the tube opening is formed by a top half and a bottom half.

13. The electric junction box assembly as set forth in claim 12, wherein the top half of the tube opening is disposed on the central housing and the bottom half of the tube opening is formed disposed on the bottom cover.

14. The electric junction box assembly as set forth in claim 13, wherein the central housing and the bottom cover are configured to engage each other.

15. The electric junction box assembly as set forth in claim 10, the tube opening has a beveled edge.

16. The electric junction box assembly as set forth in claim 15, wherein the beveled edge of the outer opening is angled more than the beveled edge of the inner opening so as to conform to the bend in the tube.

17. The electric junction box assembly as set forth in claim 16, wherein the tube opening has a diameter that gets smaller as the tube opening extends from the outer wall to the inner space.

18. The electric junction box assembly as set forth in claim 10, further including a hood, the hood over the tube opening and tube.

* * * * *